C. BARDON.
SAFETY DRILL TAP AND DIE HOLDER.
APPLICATION FILED JUNE 1, 1911.

1,005,500.

Patented Oct. 10, 1911.

Clarence Bardon, Inventor

Witnesses by C. A. Snow & Co.
Attorneys

UNITED STATES PATENT OFFICE.

CLARENCE BARDON, OF ANACONDA, MONTANA.

SAFETY DRILL-TAP AND DIE-HOLDER.

1,005,500. Specification of Letters Patent. Patented Oct. 10, 1911.

Application filed June 1, 1911. Serial No. 630,554.

*To all whom it may concern:*

Be it known that I, CLARENCE BARDON, a citizen of the United States, residing at Anaconda, in the county of Deerlodge and State of Montana, have invented a new and useful Safety Drill-Tap and Die-Holder, of which the following is a specification.

The device forming the subject matter of this application, is adapted to be employed in connection with an upright drill, a lathe, a tapping machine, a screw machine and the like, having a revolving spindle, the device being adapted to connect a tool with such spindle, in such manner that, should rotation of the tool be temporarily arrested, the rotating spindle of the machine will be rendered ineffective to twist off the tang of the tool.

It is one object of the present invention to provide novel means for frictionally assembling a tool holder with the end of a driving member.

A further object of the invention is to provide novel means for assembling this driving member with the spindle of a machine.

With the foregoing and other objects in view which will appear as the description proceeds, the invention resides in the combination and arrangement of parts and in the details of construction hereinafter described and claimed, it being understood that changes in the precise embodiment of invention can be made within the scope of what is claimed without departing from the spirit of the invention.

Figure 1:
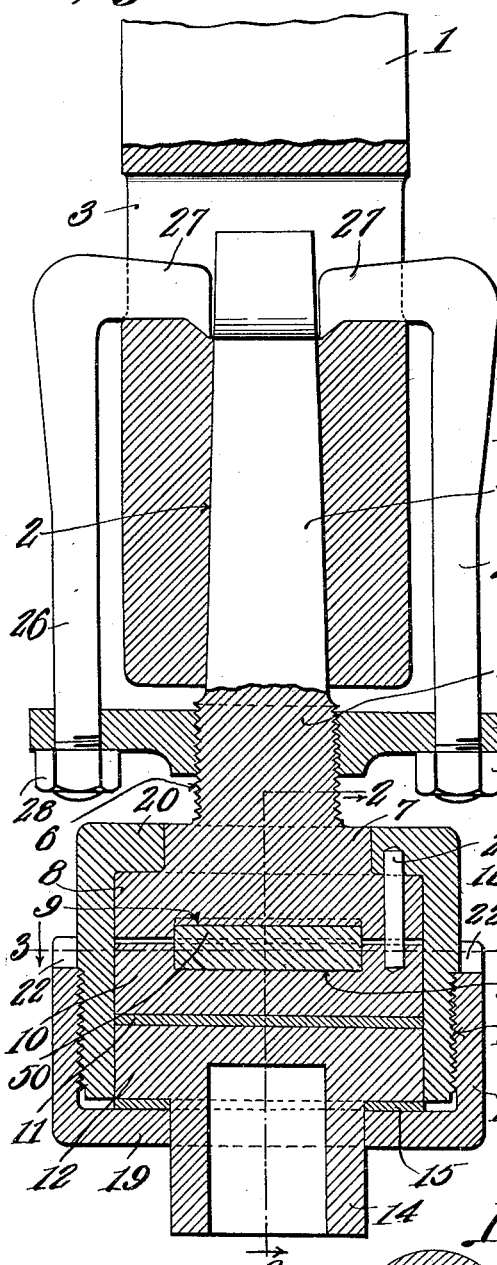
Figure 2:
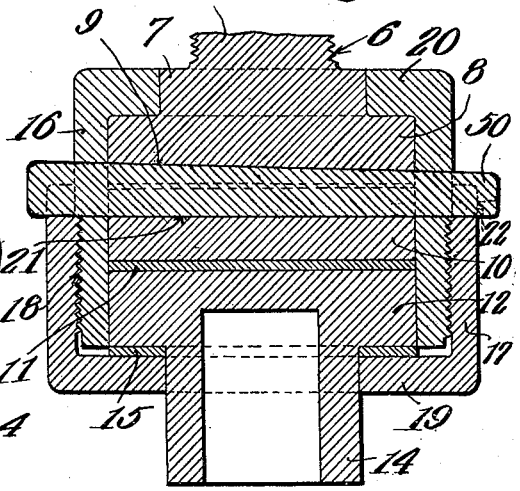
Figure 3:
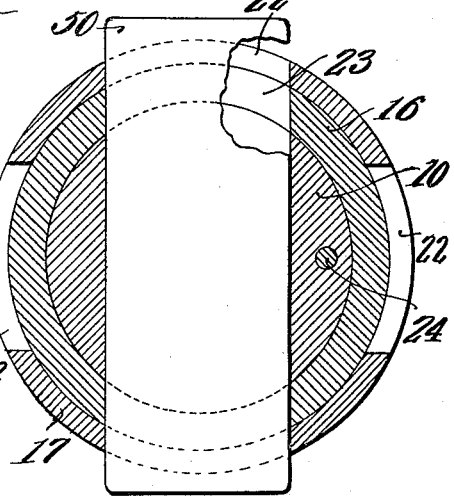
Figure 4:
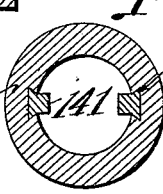

In the accompanying drawings—Figure 1 is a longitudinal section; Fig. 2 is a section on the line 2—2 of Fig. 1; Fig. 3 is a section on the line 3—3 of Fig. 1; and Fig. 4 is a transverse section showing a modified form of tool-holder.

In the drawings, the numeral 1 designates the spindle of a drill press, a milling machine, a tapping machine or the like. In the shank 1 there is fashioned, ordinarily, an axial opening 2 which may be of tapered form, the opening 2 communicating with a transverse slot 3, extended through the spindle of the machine.

In carrying out the invention there is provided a driving member, embracing a shank 4, adapted to conform to the axial opening 2 of the spindle, the shank 4 being of tapered construction, when the opening 2 is tapered. The shank 4 is enlarged in diameter slightly, to form a neck 5, which may be threaded as at 6. The neck 5, in its turn, is enlarged to form a shoulder 7, the shoulder 7 being enlarged in diameter to form a flange 8. The end face of the flange 8 is transversely grooved, as shown at 9, for a purpose to be described hereinafter.

Disposed in close relation to the end face of the flange 8, is a head 10, and abutting against the head 10 is a friction plate 11. Abutting against the friction plate 11 is the head 12 of a tool holder, the reduced neck 14 of which is adapted to receive the shank of the tool to be rotated. Around the neck 14, and abutting against the portion 12 of the tool holder, is a friction washer 15.

The invention further includes a casing in which the flange 8, the head 10, the friction disk 11, the head 12 of the tool holder are inclosed. This casing is a two-part structure, and comprises an inner member 16, upon which is threaded an outer member 17, as shown at 18. The part 17 of the casing is equipped with an inwardly extended flange 19, against which the friction washer 15 bears, the flange 19 inclosing the neck 14 of the tool holder. The part 16 is equipped with an inwardly projecting flange 20, inclosing the shoulder 7 of the driving member, peripherally, the flange 8 of the driving member being engaged beneath the flange 20 of the portion 16 of the casing.

That face of the head 10 which is disposed toward the member 8, is transversely slotted, as shown at 21, there being a slot 22 in the edge of the portion 17 of the casing, and an opening 23 in the wall of the portion 16 of the casing. In order to maintain the slots 9 and 21, and the openings 22 and 23 in alinement, a dowel pin 24 is extended through the flange 8 of the operating member, to engage the flange 20, with the portions 16 of the casing, and to engage, likewise, with the head 10. This dowel pin 24 holds the head 10, the element 16 of the casing, and the portion 8 of the driving member together, for simultaneous rotation, but the head 10 is movable longitudinally of the casing, upon the dowel pin 24, under the action of a wedge shaped locking key 50, insertible into the alined openings 9, 22, 21 and 23. At this point it may be stated that the dowel pin 24 serves as a means for alining these several openings, and, as will be explained hereinafter, the strain incident to uniting the parts 8 and 10 for simultaneous rotation, is borne by the key 50, and not by the dowel pin 24.

The driving member carries a transverse structure, adapted to receive means whereby the driving member may be united with the spindle 1. This transverse structure may consist of a plate 25, threaded upon the neck 5 of the shank of the tool holder. In the plate 25 there are oppositely positioned openings, through which are extended the ends of the arms 26, having angular extensions 27, adapted to enter transverse opening 3 of the spindle 1. Upon the ends of the arms 26, and binding against the plate 25, are nuts 28. If desired, this transverse structure whereby the arms 26 are received, consist of separable parts, having openings to receive the arms, the parts being adapted to be clamped, by means of screws or other elements adapted to a like end, in a groove formed circumferentially in the shank of the tool holder.

Referring to Fig. 4, the reference character 140 indicates that portion of the structure which is denoted by the numeral 14 in Fig. 1. The neck 140 of the tool-holder may, if desired, be provided with a pair of slidable keys 141, dove-tailed into the member 140, as shown at 142, for sliding movement, the keys 141 obviously constituting a means for holding a tool in the portion 140 of the holder.

In practical operation, the shank 4 is inserted into the axial opening 2 of the spindle 1, and the angular extensions 27, of the arms 26 are engaged in the transverse slots 3 in the spindle 1. Obviously, by rotating the nuts 28, the angular extensions 27 may be advanced toward the plate 25, the shank 4 being bound firmly in the opening 2. Thus, the driving element is securely assembled with the spindle 1. The dowel pin 24 serves to maintain the transverse groove 9 in the lower face of the part 8, alined with the transverse groove 21 in the adjacent face of the head 10. Moreover, since this dowel pin enters the part 16 of the casing, with which the part 17 of the casing is threaded, the openings 22 and 23 in the casing will aline with the grooves 9 and 21, so that the wedge shaped locking key 50 may readily be mounted in place. This key 50, registering in the openings and grooves above referred to, will serve to lock the casing, the portion 8 of the tool holder, and the head 10, together, for simultaneous rotation. When the key 50 is seated, the head 10 will be thrust against the friction disk 11, the friction disk 11 will be thrust against the head 12 of the tool holder, the head 12 of the tool holder will be thrust against the friction washer 15, the friction washer 15 will be thrust against the flange 19 of the portion 17 of the casing.

From the foregoing it will be seen that the tool holder 12—14 will be held frictionally against the head 10, the head 10 being interlocked with the driving member 4—8, for rotation therewith. However, should the rotation of the tool be stopped suddenly, the shank of the tool will not be twisted off, owing to the fact that the tool holder is held for rotation, by friction only.

The device herein disclosed is simple and rigid in construction. There are no exposed threads subject to damage, and no wrenches or other tools are necessary in order to adjust the friction with which the tool holder is held. The tapered key 50 extends slightly on both ends beyond the casing 15—17, and by driving the key 50 in opposite directions, the friction wherewith the tool holder is held, may be adjusted. Should the friction members 11 and 15 wear thin, permitting the key 50 to extend too far through the casing, the portion 17 of the casing may be rotated upon the portion 16, thereby taking up the wear, it being noted that the portion 17 of the casing has a plurality of openings 22 therein, to receive the key 50, the construction being such that the member 17 need be rotated but through a relatively small arc, before one pair of openings is alined with the opening 23 in the part 16, to receive the key 50.

As will be readily understood, the friction wherewith the tool holder 12—14 is held for rotation with the driving member 4—8, may be adjusted at any time by tapping lightly upon the wedge key 50. By removing the key 50, the device may be taken down readily, permitting the insertion of different forms of shanks, to accommodate machines of different makes, thereby doing away with the expense incident to the provision of a complete set of chucks.

Having thus described the invention, what is claimed is:

1. A device of the class described comprising a driving member; a tool holder; a casing in which the adjacent ends of the driving member and the tool holder are inclosed, the driving member and the tool holder being individually rotatable in the casing; a head rotatable in the casing, between the driving member and the tool holder; and a movable member interengaged with the driving member and with the head, to secure a simultaneous rotation of the driving member and the head, and to advance the head against the tool holder, thereby to unite the tool holder and the driving member, frictionally, for simultaneous rotation.

2. In a device of the class described, a casing; a tool holder and a driving tool retainer terminally inclosed in the casing; a head in the casing, between the tool holder and the driving member; and a key insertible into an opening in the casing, and into registering grooves in the driving member and in the head, to advance the head toward the holder, and to advance the holder toward the casing, thereby to unite the tool holder frictionally with the driving member for simultaneous rotation therewith.

3. In a device of the class described, a casing consisting of removable connected parts; a tool holder and a driving member terminally inclosed in the casing; a head in the casing, between the tool holder and the driving member; a key insertible into an opening in the casing, and into registering grooves in the driving member and in the head, to advance the head toward the holder, and to advance the holder toward the casing, thereby to unite the tool holder and the driving member, frictionally, for simultaneous rotation; and a device connecting the driving member with the head and with the casing, to aline the grooves and the opening, said device permitting the head to have movement longitudinally of the casing, under the action of the key.

4. In a device of the class described, a member having a shank adapted to enter the axial opening of a driving element; a transverse structure removably mounted upon the shank; arms extended into said structure, and having angular extensions adapted to enter a transverse slot in the driving element; and means upon the arms to engage said structure, and to move the extensions toward said structure.

In testimony that I claim the foregoing as my own, I have hereto affixed my signature in the presence of two witnesses.

CLARENCE BARDON.

Witnesses:
   DAVID GRATTAN,
   FRED B. SMITH.

---

Copies of this patent may be obtained for five cents each, by addressing the " Commissioner of Patents, Washington, D. C."